US012688850B2

(12) United States Patent (10) Patent No.: US 12,688,850 B2

Park et al. (45) Date of Patent: Jul. 21, 2026

(54) ELECTRONIC DEVICE AND CONTROL METHOD THEREFOR

(71) Applicant: SAMSUNG ELECTRONICS CO., LTD., Suwon-si (KR)

(72) Inventors: Hyeeun Park, Suwon-si (KR); Sehyun Kim, Suwon-si (KR); Jongin Lee, Suwon-si (KR); Kilsoo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 181 days.

(21) Appl. No.: 18/424,402

(22) Filed: Jan. 26, 2024

(65) Prior Publication Data

US 2024/0169986 A1 May 23, 2024

Related U.S. Application Data

(63) Continuation of application No. PCT/KR2022/012389, filed on Aug. 19, 2022.

(30) Foreign Application Priority Data

Aug. 19, 2021 (KR) ........................ 10-2021-0109726

(51) Int. Cl.
*G10L 15/22* (2006.01)
*G10L 15/28* (2013.01)
*G10L 21/034* (2013.01)

(52) U.S. Cl.
CPC .............. *G10L 15/22* (2013.01); *G10L 15/28* (2013.01); *G10L 21/034* (2013.01); *G10L 2015/228* (2013.01)

(58) Field of Classification Search
None
See application file for complete search history.

(56) References Cited

U.S. PATENT DOCUMENTS 7,992,170 B2 * 8/2011 You ..................... H04N 21/4126
                                                          725/39
8,600,762 B2 12/2013 Shin
                    (Continued)

FOREIGN PATENT DOCUMENTS

EP          3 866 160 A1    8/2021
KR      10-1309794 B1    9/2013
                    (Continued)

OTHER PUBLICATIONS

International Search Report (PCT/ISA/210) issued by the International Searching Authority on Dec. 7, 2022 in International Application No. PCT/KR2022/012389.

(Continued)

*Primary Examiner* — Jonathan C Kim
(74) *Attorney, Agent, or Firm* — Sughrue Mion, PLLC

(57) ABSTRACT

An electronic apparatus includes a communication interface configured to communicate with an external device; a speaker; a memory storing at least one instruction; and at least one processor operatively connected to the communication interface, the speaker, and the memory, wherein the at least one processor is configured to execute the at least one instruction to: based on a voice signal being received from an external device through the communication interface, identify whether the external device is a privacy device; based on identifying that the external device is a privacy device, output a response signal regarding the voice signal to the external device through the communication interface; and based on identifying that the external device is not a privacy device, output a response signal regarding the voice signal through the speaker.

20 Claims, 13 Drawing Sheets

(56) References Cited

U.S. PATENT DOCUMENTS

| | | | |
|---|---|---|---|
| 10,115,395 B2 | 10/2018 | Heo | |
| 10,147,425 B2 | 12/2018 | Yang | |
| 10,304,443 B2 | 5/2019 | Kwon et al. | |
| 12,154,573 B2 | 11/2024 | Ko et al. | |
| 2002/0078204 A1 | 6/2002 | Newell et al. | |
| 2013/0201397 A1* | 8/2013 | Ayoub | H04R 5/04 |
| | | | 381/74 |
| 2014/0006022 A1 | 1/2014 | Yoon et al. | |
| 2014/0170979 A1* | 6/2014 | Samanta Singhar | G10L 25/60 |
| | | | 455/41.2 |
| 2018/0025725 A1* | 1/2018 | Qian | G10L 15/22 |
| | | | 704/257 |
| 2018/0165472 A1* | 6/2018 | Adams | G06F 21/83 |
| 2018/0330069 A1* | 11/2018 | Quinn | G10L 15/22 |
| 2020/0034492 A1* | 1/2020 | Verbeke | G06F 16/636 |
| 2020/0074988 A1 | 3/2020 | Park et al. | |
| 2020/0090654 A1 | 3/2020 | Shin et al. | |
| 2020/0225909 A1 | 7/2020 | McCarty et al. | |
| 2021/0375275 A1 | 12/2021 | Yoon et al. | |
| 2021/0385579 A1* | 12/2021 | Nesfield | H04N 21/44218 |
| 2023/0048330 A1* | 2/2023 | Huang | G06F 21/6245 |
| 2024/0169986 A1* | 5/2024 | Park | G10L 15/28 |

FOREIGN PATENT DOCUMENTS

| | | |
|---|---|---|
| KR | 10-1513615 B1 | 4/2015 |
| KR | 10-2015-0087025 A | 7/2015 |
| KR | 10-2015-0103586 A | 9/2015 |
| KR | 10-2015-0144547 A | 12/2015 |
| KR | 10-2016-0027627 A | 3/2016 |
| KR | 10-2016-0147556 A | 12/2016 |
| KR | 10-2017-0132622 A | 12/2017 |
| KR | 10-2018-0126946 A | 11/2018 |
| KR | 10-2020-0050152 A | 5/2020 |
| KR | 10-2020-0089412 A | 7/2020 |
| KR | 10-2020-0109140 A | 9/2020 |
| KR | 10-2020-0095719 A | 5/2026 |
| WO | 2019/234486 A1 | 12/2019 |

OTHER PUBLICATIONS

Written Opinion (PCT/ISA/237) issued by the International Searching Authority on Dec. 7, 2022 in International Application No. PCT/KR2022/012389.

Communication dated Apr. 24, 2025, issued by the European Patent Office in counterpart European Application No. 22858789.5.

Communication issued Sep. 2, 2024 by the European Patent Office in European Patent Application No. 22858789.5.

Communication issued Nov. 25, 2024 by the European Patent Office in European Patent Application No. 22858789.5.

Communication dated Apr. 24, 2026, issued by the European Patent Office in European Patent Application No. 26164759.8.

Communication issued May 26, 2026 by the Korean Ministry of Intellectual Property for Korean Patent Application No. 10-2021-0109726 which was filed on Aug. 19, 2021.

* cited by examiner 200
220
210
"WHAT TIME
IS IT NOW?"

100
120

200
220
210
"IT IS 3
O'CLOCK IN
THE AFTERNOON"

100
120

"WHAT TIME IS IT NOW?"

"IT IS 3 O'CLOCK IN THE AFTERNOON"

200-1

100

"WHAT TIME
IS IT NOW?"

200-2

120

"IT IS 3
O'CLOCK IN
THE AFTERNOON"

ELECTRONIC DEVICE AND CONTROL METHOD THEREFOR

CROSS-REFERENCE TO RELATED APPLICATIONS

This application is a by-pass continuation application of International Application No. PCT/KR2022/012389, filed on Aug. 19, 2022, which is based on and claims priority to Korean Patent Application No. 10-2021-0109726, filed on Aug. 19, 2021, in the Korean Intellectual Property Office, the disclosures of which are incorporated by reference herein in their entireties.

BACKGROUND

1. Field

The disclosure relates to an electronic apparatus and a controlling method thereof, and more particularly, to an electronic apparatus that outputs a response signal regarding a voice signal and a controlling method thereof.

2. Description of Related Art

With the development of electronic technology, various types of electronic apparatuses are being developed and distributed. In particular, display apparatuses such as televisions (TVs) used at home have been developed continuously in recent years to meet the needs of users.

In particular, display apparatuses such as TVs which are currently distributed have the function of recognizing the user's voice and outputting a response to the voice. Here, the user's voice may be input through various ways such as a remote controller, an external microphone, an external speaker, or a headset as well as the speaker provided in a TV, depending on the usage environment. In this case, there is a need to output a response to the user's voice, which is suitable for the usage environment.

SUMMARY

Provided are an electronic apparatus that may identify a device to output a response according to the type of external device from which the user's voice is received, and a controlling method thereof.

According to an aspect of the disclosure, an electronic apparatus including: a communication interface configured to communicate with an external device; a speaker; a memory storing at least one instruction; and at least one processor operatively connected to the communication interface, the speaker, and the memory, wherein the at least one processor is configured to execute the at least one instruction to: based on a voice signal being received from an external device through the communication interface, identify whether the external device is a privacy device; based on identifying that the external device is a privacy device, output a response signal regarding the voice signal to the external device through the communication interface; and based on identifying that the external device is not a privacy device, output a response signal regarding the voice signal through the speaker.

The at least one processor may be further configured to execute the at least one instruction to: based on a trigger signal for voice recognition being received from the external device, activate a voice recognition function and identify whether the external device is a privacy device; based on a signal corresponding to a subsequent voice being received from the external device identified as a privacy device, perform voice recognition regarding the signal corresponding to the subsequent voice; and control the communication interface to output a response signal regarding the signal corresponding to the subsequent voice to the external device based on a result of the voice recognition.

The electronic apparatus may further include: a first audio output unit connected to the communication interface; and a second audio output unit connected to the speaker, wherein the at least one processor configured to: based on the voice signal being received from the external device while an audio signal corresponding to audio content is being output to at least one of the first audio output unit or the second audio output unit, identify whether the external device is a privacy device; based on identifying that the external device is a privacy device, control the first audio output unit to output a response signal regarding the voice signal at a first output volume of a same level as an output volume of the audio signal; and based on identifying that the external device is not a privacy device, control the second audio output unit to output a response signal regarding the voice signal at a second output volume of a level different from the output volume of the audio signal.

The second output volume may be greater than the output volume of the audio signal.

The at least one processor may be further configured to execute the at least one instruction to: based on the voice signal being received from a plurality of external devices through the communication interface, identify whether each of the plurality of external devices is a privacy device; and based on identifying that a first external device of the plurality of external devices is a privacy device and a second external device is not a privacy device, output a response signal regarding the voice signal to the first external device through the communication interface.

The at least one processor may be further configured to execute the at least one instruction to: based on the voice signal being received from a plurality of external devices through the communication interface, identify at least one of the plurality of external devices based on a size of the voice signal; based on identifying that the at least one of the plurality of external devices is a privacy device, control the communication interface to output a response signal regarding the voice signal to the at least one of the plurality of external devices; and based on identifying that the identified at least one of the plurality of external devices is not a privacy device, output a response signal regarding the voice signal through the speaker.

The at least one processor may be further configured to execute the at least one instruction to: based on the voice signal being received from a plurality of external devices through the communication interface, identify whether each of the plurality of external devices is a privacy device; and transmit a control signal for turning off a microphone of a device that is identified as not a privacy device of the plurality of external devices through the communication interface.

The at least one processor may be further configured to execute the at least one instruction to, while an audio signal corresponding to game content is output to at least one of the external device or the speaker, identify whether the external device is a privacy device based on the voice signal being received from the external device.

The at least one processor may be further configured to execute the at least one instruction to identify whether the external device is a privacy device based on identification information of the external device.

The external device may include at least one of a headset, a remote controller, a microphone, or a speaker.

According to an aspect of the disclosure, a method of controlling an electronic apparatus that may include a communication interface and a speaker, includes: based on a voice signal being received from an external device through the communication interface, identifying whether the external device is a privacy device; based on identifying that the external device is a privacy device, outputting a response signal regarding the voice signal to the external device through the communication interface; and based on identifying that the external device is not a privacy device, outputting a response signal regarding the voice signal through the speaker.

The identifying whether the external device is a privacy device may include: based on a trigger signal for voice recognition being received from the external device, activating a voice recognition function and identifying whether the external device is a privacy device; and based on a signal corresponding to a subsequent voice being received from the external device identified as a privacy device, performing voice recognition regarding the signal corresponding to the subsequent voice, and wherein the outputting the response signal to the external device through the communication interface may include: outputting a response signal regarding the signal corresponding to the subsequent voice to the external device through the communication interface based on a result of the voice recognition.

The electronic apparatus further may include a first audio output unit connected to the communication interface and a second audio output unit connected to the speaker, wherein the identifying the privacy device may include: based on the voice signal being received from the external device while an audio signal corresponding to audio content is being output to at least one of the first audio output unit or the second audio output unit, identifying whether the external device is a privacy device, wherein the outputting the response signal to the external device through the communication interface may include: based on identifying that the external device is a privacy device, controlling the first audio output unit to output a response signal regarding the voice signal at a first output volume of a same level as an output volume of the audio signal, and wherein the outputting the response signal through the speaker may include, based on identifying that the external device is not a privacy device, controlling the second audio output unit to output a response signal regarding the voice signal at a second output volume of a level different from the output volume of the audio signal.

The second output volume may be greater than the output volume of the audio signal.

The method further may include: based on the voice signal being received from a plurality of external devices through the communication interface, identifying whether each of the plurality of external devices is a privacy device; and based on identifying that a first external device of the plurality of external devices is a privacy device and a second external device is not a privacy device, outputting a response signal regarding the voice signal to the first external device through the communication interface.

The method further may include: based on the voice signal being received from a plurality of external devices through the communication interface, identifying at least one of the plurality of external devices based on a size of the voice signal; based on identifying that the at least one of the plurality of external devices is a privacy device, controlling the communication interface to output a response signal regarding the voice signal to the identified at least one of the plurality of external devices; and based on identifying that the at least one of the plurality of external devices is not a privacy device, outputting a response signal regarding the voice signal through the speaker.

The method further may include: based on the voice signal being received from a plurality of external devices through the communication interface, identifying whether each of the plurality of external devices is a privacy device; and transmitting a control signal for turning off a microphone of a device that is identified as not a privacy device of the plurality of external devices through the communication interface.

The method further may include, while an audio signal corresponding to game content is output to at least one of the external device or the speaker, identifying whether the external device is a privacy device based on the voice signal being received from the external device.

The method further may include identifying whether the external device is a privacy device based on identification information of the external device.

According to an aspect of the disclosure, a non-transitory computer readable recording medium that stores computer instructions that, when executed by a processor of an electronic apparatus including a communication interface and a speaker, cause the electronic apparatus to perform an operation, the operation including: based on a voice signal being received from an external device through the communication interface, identifying whether the external device is a privacy device; based on identifying that the external device is a privacy device, outputting a response signal regarding the voice signal to the external device through the communication interface; and based on identifying that the external device is not a privacy device, outputting a response signal regarding the voice signal through the speaker According to one or more example embodiments, it is possible to identify an apparatus that will output a response signal regarding a voice signal according to the type of external device connected to an electronic apparatus, thereby improving user convenience.

BRIEF DESCRIPTION OF THE DRAWINGS

The above and other aspects, features, and advantages of certain example embodiments of the present disclosure are more apparent from the following description taken in conjunction with the accompanying drawings, in which.

DETAILED DESCRIPTION

Figure 1:
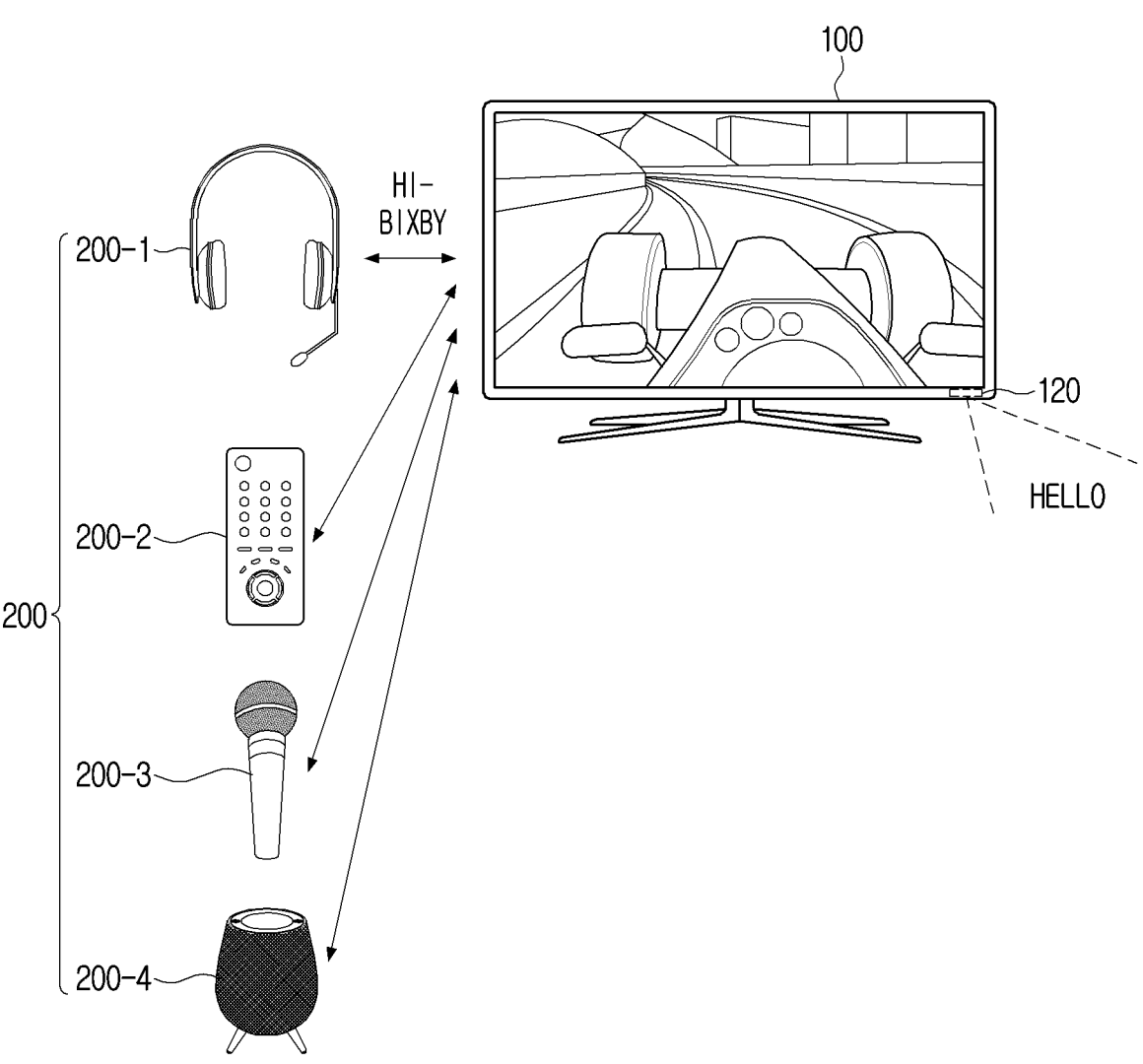
FIG. 1 is a view illustrating an implementation form of an electronic apparatus according to one or more embodiments.

Hereinafter, various embodiments of the disclosure is described in detail with reference to the accompanying drawings.

Terms used in the specification are briefly described, and the disclosure is then described in detail.

General terms that are currently widely used are selected as the terms used in one or more example embodiments in consideration of their functions and may be changed based on the intention of those skilled in the art or a judicial precedent, the emergence of a new technique, or the like. In addition, in a specific case, terms arbitrarily chosen by an applicant may exist. In this case, the meanings of such terms are mentioned in detail in corresponding descriptions of the disclosure. Therefore, the terms used in the one or more embodiments are to be defined on the basis of the meanings of the terms and the contents throughout the disclosure rather than simple names of the terms.

In the disclosure, an expression "have", "may have", "include", "may include" or the like, indicates the existence of a corresponding feature (for example, a numerical value, a function, an operation or a component such as a part), and does not exclude the existence of an additional feature.

Herein, the expression, "at least one of A or B" may indicate "A" or "B" or "both of A and B."

Expressions "first", "second", and the like, used in the disclosure may indicate various components regardless of the sequence or importance of the components. These expressions are used only to distinguish one component from another component, and do not limit the corresponding components.

In case that any component (for example, a first component) is mentioned to be "(operatively or communicatively) coupled with/to" or "connected to" another component (for example, a second component), it is to be understood that any component may be directly coupled to another component or may be coupled to another component through still another component (for example, a third component).

A term of a singular number may include its plural number unless explicitly indicated otherwise in the context. It is to be understood that a term "include", "formed of", or the like used in the application specifies the presence of features, numerals, steps, operations, components, parts, or combinations thereof, mentioned in the specification, and does not preclude the presence or addition of one or more other features, numerals, steps, operations, components, parts, or combinations thereof.

In the embodiments, a "module" or a "~er/~or" may perform at least one function or operation, and be implemented by hardware or software or be implemented by a combination of hardware and software. In addition, a plurality of "modules" or a plurality of "~ers/~ors" may be integrated in at least one module and implemented by at least one processor except for a "module" or a "~er/or" that needs to be implemented by specific hardware.

Hereinafter, one or more example embodiments will be described in greater detail with reference accompanying drawings.

FIG. 1 is a view provided to illustrate an electronic apparatus according to one or more embodiments.

As illustrated in the drawing, the electronic apparatus 100 may be, for example, a TV, but is not limited thereto. The electronic apparatus 100 may be implemented as various devices capable of displaying, such as near eye display (NED), large format display (LFD), digital signage, digital information display (DID), video wall, smartphone, laptop, tablet, head mounted display (IMD).

According to one or more embodiments, when a user voice is received, the electronic apparatus 100 may perform a voice recognition function of providing a response signal corresponding to the user voice. According to one or more embodiments, the user voice may be received through a speaker 120 provided in the electronic apparatus 100. Additionally, according to one or more embodiments, the user voice may be received from an external device 200. For example, the electronic apparatus 200 may be implemented as various types of devices such as a headset 200-1, a remote controller 200-2, a microphone 200-3, and a speaker 200-4.

According to one or more embodiments, the electronic apparatus 100 may output a response signal regarding a user voice to a predetermined device. In this case, in the case where the electronic apparatus 100 is implemented as a public device such as a TV, when a response signal is output to the TV speaker 120 while content playback sound is output through the TV speaker, interference with the content playback sound may occur. In addition, when a response signal is output to the TV speaker 120 while content playback sound is output through a privacy device such as the headset 200-1, there is a problem in that the user may not clearly listen to the response signal.

Accordingly, hereinafter, one or more embodiments outputting a response signal regarding a user voice to different external devices according to the type of external device connected to the electronic apparatus 100 will be described.

Figure 2:
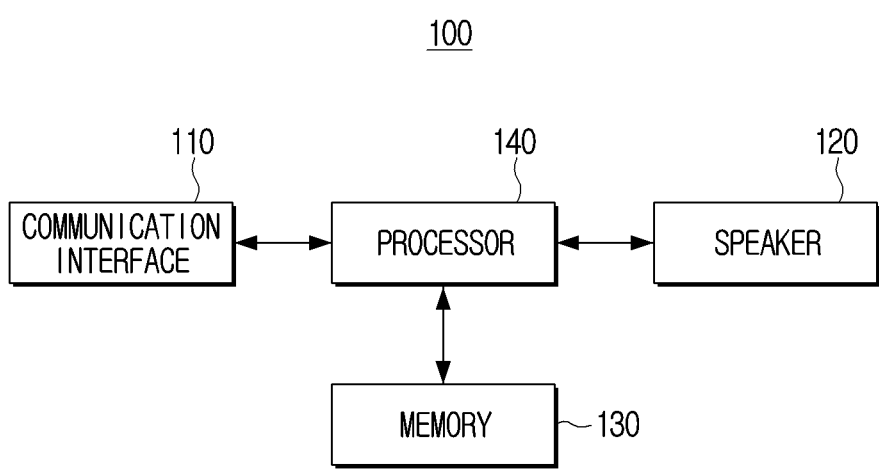
FIG. 2 is a block diagram illustrating configuration of an electronic apparatus according to one or more embodiments.

FIG. 2 is a block diagram illustrating configuration of an electronic apparatus according to one or more embodiments.

According to FIG. 2, the electronic apparatus 100 may include a communication interface 110, a speaker 120, a memory 130, and at least one processor 140.

The communication interface 110 may be implemented as various interfaces depending on the implementation example of the electronic apparatus 100. For example, the communication interface 110 may communication with the external device 200 through communication methods such as various types of digital interfaces, such as AP-based Wi-Fi (Wireless LAN Network), Bluetooth, Zigbee, wired/wireless Local Area Network (LAN), Wide Area Network (WAN), Ethernet, IEEE 1394, High-Definition Multimedia Interface (HDMI), Universal Serial Bus (USB), Mobile High-Definition Link (MHL), Audio Engineering Society/ European Broadcasting Union (AES/EBU), Optical, or Coaxial, for example.

The speaker 120 may output an audio signal processed by the at least one processor 140. Here, the speaker 120 may include at least one speaker unit. The at least one speaker unit performs the function of converting electric pulses into sound waves, and may be implemented in a dynamic type that is divided according to the principle and method of converting electrical signals into sound waves. However, the at least one speaker unit is not limited thereto and may be implemented such as in an electrostatic type, a dielectric type, or a magnetostriction type, for example. Here, the at least one speaker unit may be implemented in plural numbers, and may take charge of and play each of a plurality of channels such as 2 channels, 2.1 channels, 3 channels, 3.1 channels, 5.1 channels, or 7.1 channels, for example. For example, a plurality of speaker units may include a left (L) channel speaker and a right (R) channel speaker.

The memory 130 may store data for performing various operations. The memory 130 may be implemented in the form of a memory embedded in the electronic apparatus 100 or in the form of a memory detachable from the electronic apparatus 100, based on a data storing purpose. For example, data for driving the electronic apparatus 100 may be stored in the memory embedded in the electronic apparatus 100, and data for an extension function of the electronic apparatus 100 may be stored in the memory detachable from the electronic apparatus 100. The memory embedded in the electronic apparatus 100 may be implemented as at least one of a volatile memory (for example, a dynamic random access memory (DRAM), a static RAM (SRAM), or a synchronous dynamic RAM (SDRAM)), a non-volatile memory (for example, an one time programmable read only memory (OTPROM), a programmable ROM (PROM), an erasable and programmable ROM (EPROM), an electrically erasable and programmable ROM (EEPROM), a mask ROM, or a flash ROM, a flash memory (for example, a NAND flash or a NOR flash), a hard drive, or a solid state drive (SSD)). In addition, the memory detachable from the electronic apparatus 100 may be implemented in the form of a memory card (for example, a compact flash (CF), a secure digital (SD), a micro secure digital (Micro-SD), a mini secure digital (Mini-SD), an extreme digital (xD), or a multimedia card (MMC)), or an external memory which may be connected to a USB port (for example, a USB memory).

The memory 130, according to one or more embodiments, may store device type information mapped to each identification information of the external device 200. Here, the identification information may include at least one of the model name, device serial number, or manufacturer information. In addition, the device type information may be a privacy device or a public device. According to one or more embodiments, the memory 130 may store a lookup table in which device type information (a privacy device or a public device) corresponding to the device model name is mapped.

In addition, the memory 130 may store information related to voice recognition. As an example, the memory 130 may store information corresponding to a trigger voice for voice recognition. For example, the memory 130 may store frequency information corresponding to the user's trigger voice. As another example, the memory 130 may store template information for generating a basic response signal. As another example, the memory 130 may store a voice recognition module for voice recognition. Here, the voice recognition module may include a Natural Language Understanding (NLU) module, or an Automatic Speech Recognition (ASR) module, for example, but is not limited thereto.

The processor 140 is electrically connected to the communication interface 110, the speaker 120 and the memory 130 and controls the overall operations of the electronic apparatus 100. The processor 140 may consist of one or more processors. Specifically, the processor 140 may perform the operations of the electronic apparatus 100 according to one or more embodiments by executing at least one instruction stored in the memory 130.

According to one or more embodiments, the processor 140 may be implemented as a digital signal processor (DSP), a microprocessor, a Graphics Processing Unit (GPU), an Artificial Intelligence (AI) processor, a Neural Processing Unit (NPU), or a Time controller (TCON) that processes a digital image signal. However, the processor 140 is not limited thereto, and may include one of a central processing unit (CPU), a Micro Controller Unit (MCU), a micro processing unit (MPU), a controller, an application processor (AP) or more, or may be defined by the corresponding term. In addition, the processor 140 may be implemented as a System on Chip (SoC) or large scale integration (LSI) with a built-in processing algorithm, or may be implemented in the form of an application specific integrated circuit (ASIC) or a Field Programmable gate array (FPGA).

At least one processor 140 may receive a voice signal from the external device 200 connected to the electronic apparatus 100 by controlling the communication interface 110. Here, the voice signal may be, for example, various user voice signals including a trigger signal that activates a voice recognition function, a voice command signal, or a signal for terminating the voice recognition function.

According to one or more embodiments, in a case where the user's voice signal is received from the external device 200 through the communication interface 110, the processor 140 may identify whether the external device 200 is a privacy device. Subsequently, when it is identified that the external device 200 is a privacy device, the processor 140 may output a response signal regarding the voice signal to the external device 200 through the communication interface 110.

Figure 3:
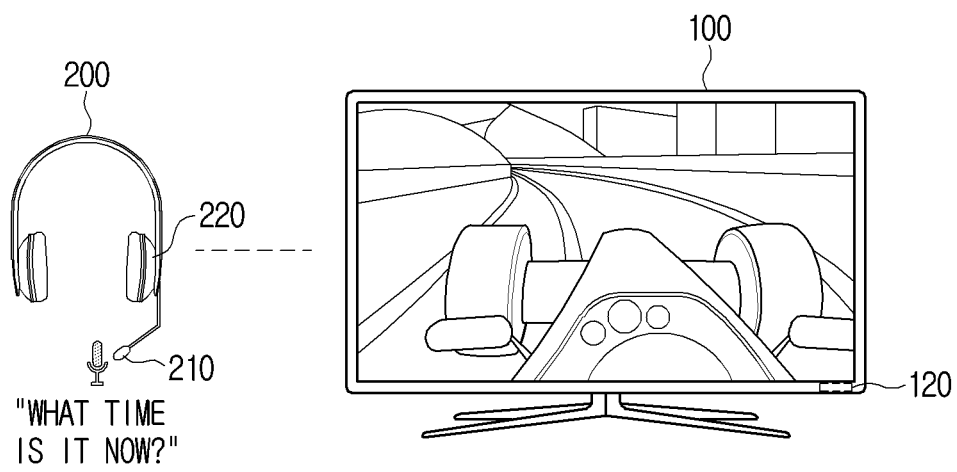
FIG. 3 is a view illustrating a method of identifying an output device of a response signal depending on a type of external device according to one or more embodiments.
Figure 3:
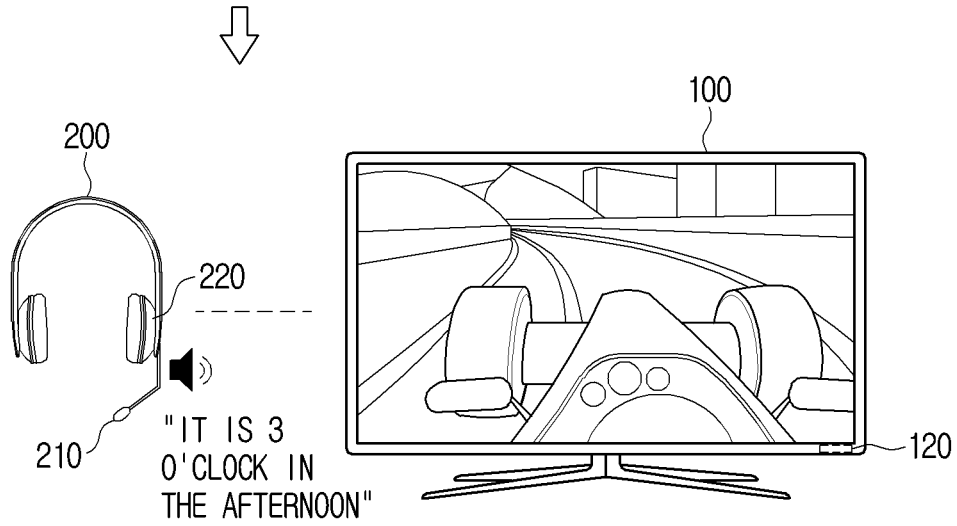

FIG. 3 is a view provided to explain a method of identifying an output device of a response signal depending on a type of external device according to one or more embodiments.

According to one or more embodiments, the external device 200 may be implemented as a headset, and may include a microphone 210 and a speaker 220.

According to one or more embodiments, when the user's voice signal is received from the external device 200 through the communication interface 110, the processor 140 may identify whether the external device 200 is a privacy device.

As illustrated in FIG. 3, when the user's voice signal received through the microphone 210 of the external device 200 is received through the communication interface 110, the processor 140 may identify whether the external device 200 is a privacy device based on identification information of the external device 200. According to one or more embodiments, when communication between the electronic apparatus 100 and the external device 200 is established via Bluetooth, whether the external device 200 is a privacy device is identified based on identification information of the external device 200 received according to Bluetooth communication pairing. For example, whether the external device 200, that is, the headset is a privacy device may be identified based on mapping information stored in the memory 130.

Subsequently, when it is identified that the external device 200 is a privacy device, the processor 140 may control the communication interface 110 to output a response signal corresponding to the user's voice signal to the external device 200. For example, when the user voice stating, "What time is it now?", is received, response information such as "It is 3 o'clock in the afternoon" can be output to the external device 200 through the communication interface 110.

Referring back to FIG. 2, when it is identified that the external device is not a privacy device, the processor 140 may output a response signal regarding the voice signal through the speaker 120.

Figure 4:
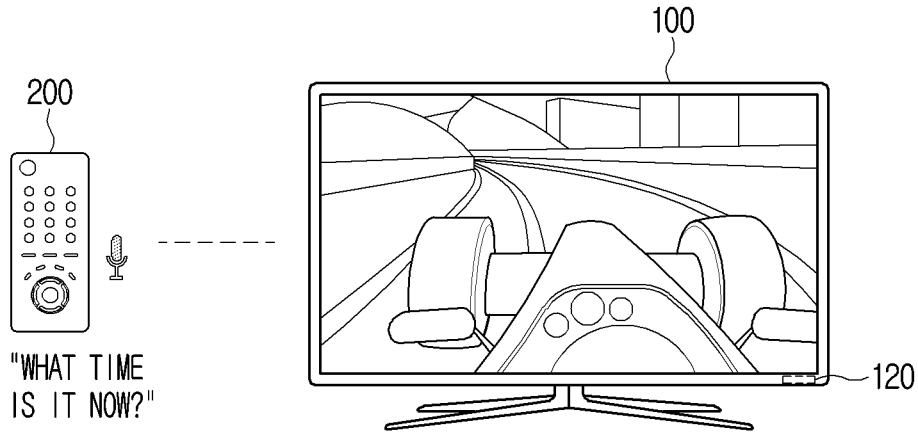
FIG. 4 is a view illustrating a method of identifying an output device of a response signal depending on a type of external device according to one or more embodiments.
Figure 4:
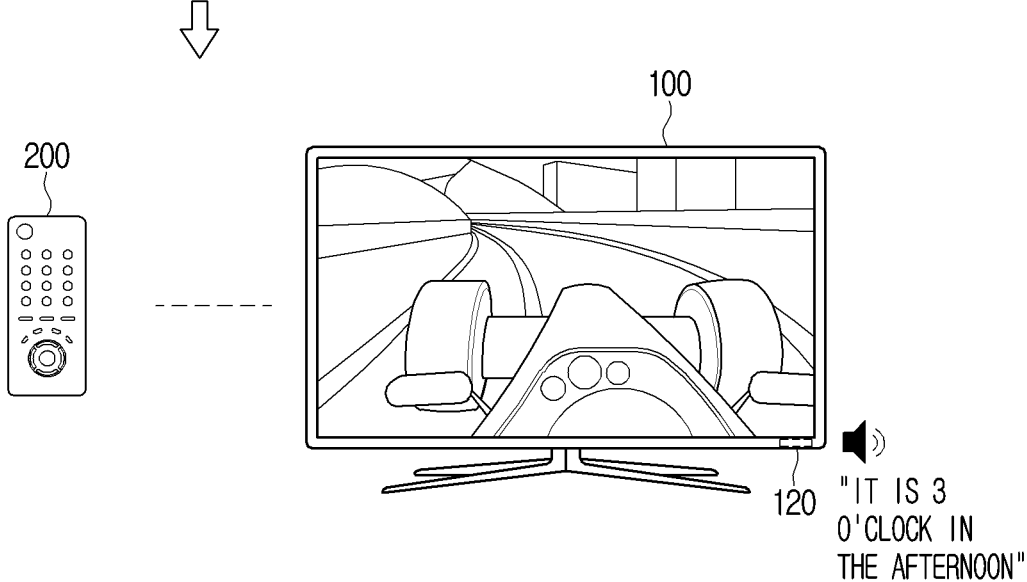

FIG. 4 is a view provided to explain a method of identifying an output device of a response signal depending on a type of external device according to one or more embodiments.

As illustrated in FIG. 4, when it is identified that the external device 200 is not a privacy device, the processor 140 may output a response signal corresponding to the user's voice signal through the speaker 120. For example, when the user voice stating, "What time is it now?", is received, response information such as "It is 3 o'clock in the afternoon" can be output through the speaker 120.

Referring back to FIG. 2, when a trigger signal for voice recognition is received from the external device, the processor 140 may activate a voice recognition function and identify whether the external device is a privacy device. Here, the trigger signal for voice recognition may be a voice signal set based on at least one of the manufacturer, the product or the user, such as "Hi-Bixby".

According to one or more embodiments, when a signal corresponding to the user's subsequent voice is received from the external device identified as a privacy device, the processor 140 may perform voice recognition regarding the received signal. In addition, the processor 140 may control the communication interface 110 to output a response signal regarding the received signal to the external device based on a result of the voice recognition.

According to one or more embodiments, when it is identified that the external device is a privacy device, the processor 140 may output a response signal regarding the voice signal to the external device as a first output volume of the same level as the output volume of the audio signal, and when it is identified that the external device is not a privacy device, may control the speaker 120 to output a response signal regarding the voice signal as a second output volume different from the volume of the audio signal.

According to one or more embodiments, when the user's voice signal is received from the external device while an audio signal corresponding audio content is output to at least one of a first audio output unit or a second audio output unit, the processor 140 may identify whether the external device is a privacy device. Here, the first audio output unit may process the audio signal and transmit it to the communication interface 110. The first audio output unit may include a D/A converter and an audio amplifier, but is not limited thereto. The first audio output unit may be implemented as part of the communication interface 110. Here, the second audio output unit may process the audio the audio signal and transmit it to the speaker 120. The first audio output unit may include a D/A converter and an audio amplifier, but is not limited thereto. The first audio output unit may be implemented as part of the speaker 120.

In this case, if the external device is identified as a privacy device, the processor 140 may control the first audio output unit to output a response signal regarding the voice signal as the first output volume of the same level as the output volume of the audio signal.

In addition, if it is identified that the external device is not a privacy device, the processor 140 may control the second audio output unit to output a response signal regarding the voice signal as the second output volume different from the volume of the audio signal. Here, the second output volume may be larger than the output volume of the audio signal.

Figure 5:
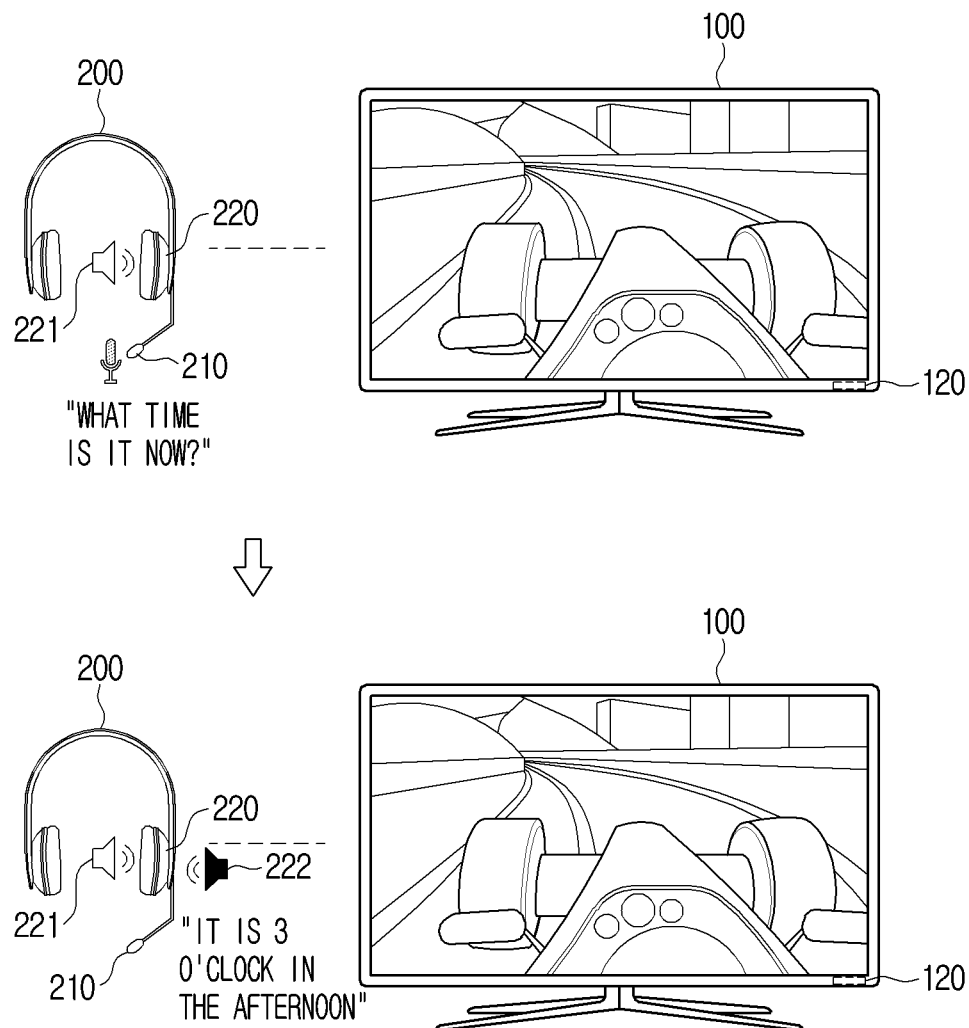
FIG. 5 is a view illustrating a method of controlling an output volume level of a response signal according to one or more embodiments.
Figure 6:
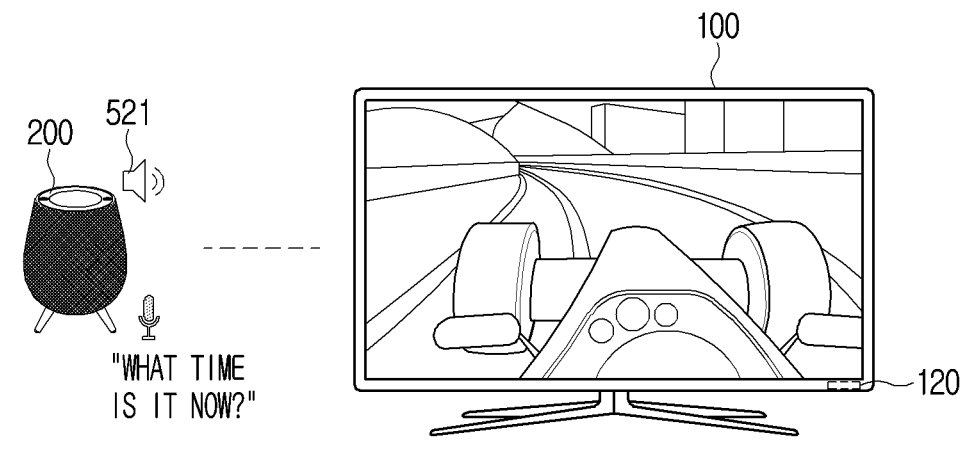
FIG. 6 is a view illustrating a method of controlling an output volume level of a response signal according to one or more embodiments.
Figure 6:
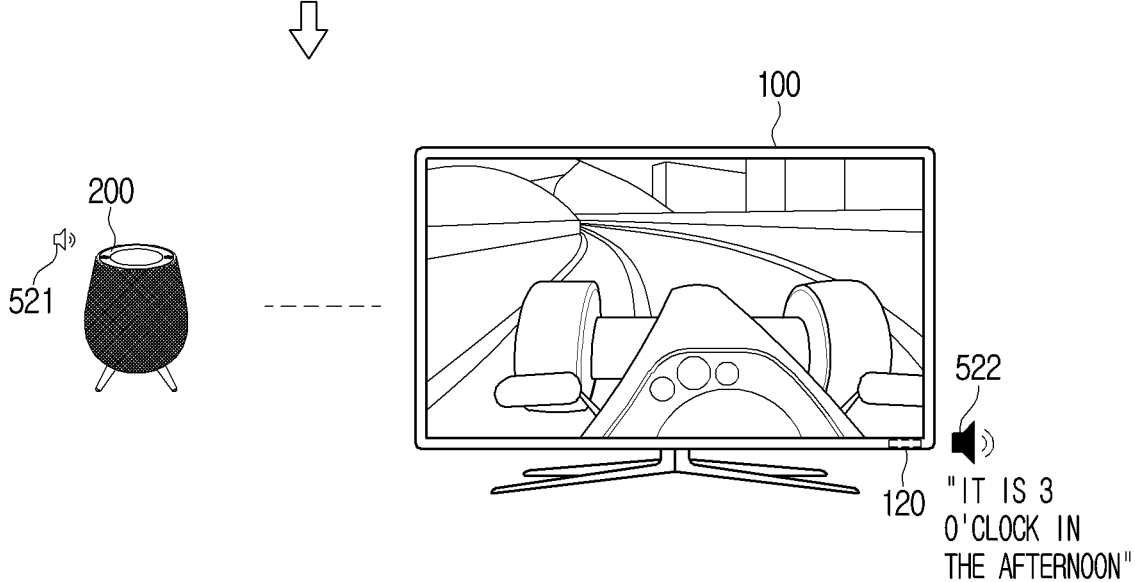

FIGS. 5 and 6 are views provided to explain a method of controlling an output volume level of a response signal according to one or more embodiments.

According to FIG. 5, when the user's voice signal is received from the external device 200 while an audio signal corresponding to the audio content is output to the speaker 220 of the external device 200, the processor 140 may identify whether the external device 200 is a privacy device. Subsequently, when it is identified that the external device 200 is a privacy device, the processor 140 may control the first audio output unit connected to the communication interface 110 to output a response signal regarding the user's voice signal as a first output volume 222 of the same level as an output volume 221 of the audio signal. Accordingly, based on the user voice stating, "What time is it now?", when response information such as "It is 3 o'clock in the afternoon" is output through the speaker 220 of the external device 200, the response information may be output as the first output volume 222 of the same level as the output volume 221 of the audio signal.

According to FIG. 6, when it is identified that the external device 200 is not a privacy device, the processor 140 may control the second audio output unit to output a response signal regarding the user's voice signal as a second output volume 522 of a different level from an output volume 521 of the audio signal. Accordingly, based on the user voice stating, "What time is it now?", when response information such as "It is 3 o'clock in the afternoon" is output through the speaker 220 of the external device 200, the response information may be output as the second output volume 522 that is larger than the level of the output volume 521 of the audio signal. For example, the processor 140 may control the speaker 120 so that the output volume 521 of the audio signal is lower than before the user's voice signal is input, but is not limited thereto.

Referring back to FIG. 2, according to one or more embodiments, when the user's voice signal is received from a plurality of external devices through the communication interface 110, the processor 140 may identify whether each of the plurality of external devices is a privacy device.

According to one or more embodiments, when it is identified that a first external device of the plurality of external devices is a privacy device and a second external device is not a privacy device, the processor 140 may control the communication interface 110 to output a response signal regarding the voice signal to the first external device through the communication interface 110.

Figure 7:
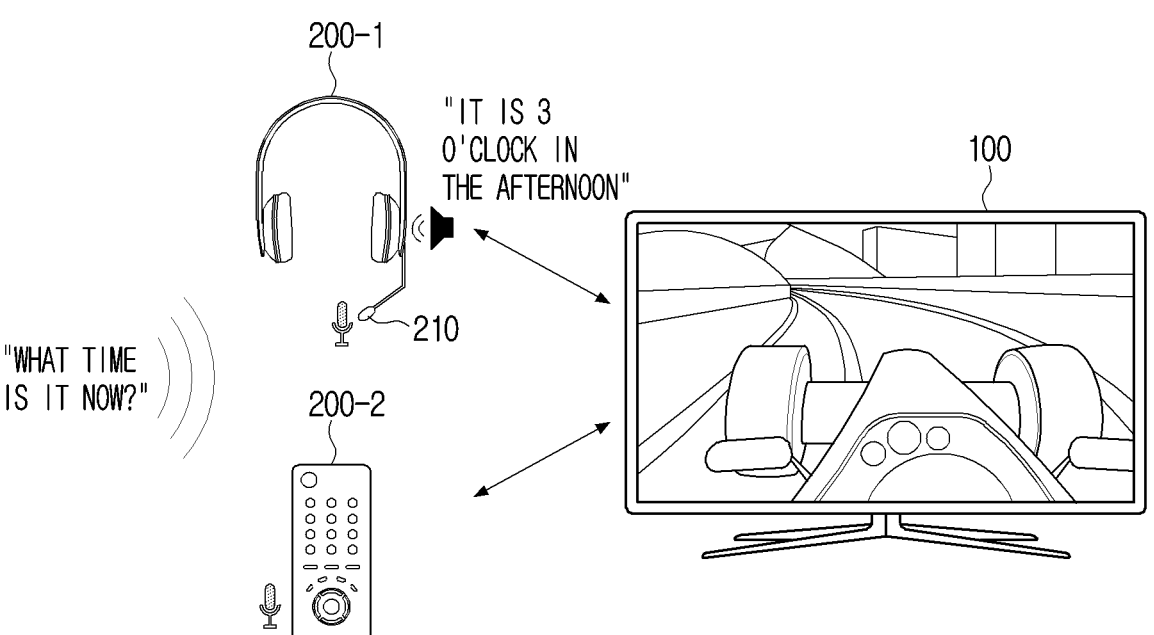
FIG. 7 is a view illustrating a method of controlling a response signal output when a voice signal is received from a plurality of external devices according to one or more embodiments.

FIG. 7 is a view provided to explain a method of controlling a response signal output when a voice signal is received from a plurality of external devices according to one or more embodiments.

According to FIG. 7, when the user's voice signal is received from a plurality of external devices 200-1, 200-2 through the communication interface 110, the processor 140 may identify that the headset 200-1 of the plurality of external devices 200-1, 200-2 as a privacy device and the remote controller 200-2 as not a privacy device, that is, a public device, based on mapping information stored in the memory 130. In this case, the processor 140 may output a response signal regarding the user's voice signal to the headset 200-1, which is a privacy device, and not to the remote controller 200-2, which is a public device, through the communication interface 110.

Referring back to FIG. 2, according to one or more embodiments, when the user's voice signal is received from a plurality of external devices through the communication interface 110, the processor 140 may identify one of the plurality of external devices based on the size of the received voice signal.

Subsequently, when it is identified that the identified external device is a privacy device, the processor 140 may control the communication interface 110 to output a response signal regarding the voice signal to the identified external device. In addition, when it is identified that the identified external device is not a privacy device, the processor 140 may output a response signal regarding the voice signal to the speaker 120.

Figure 8A:
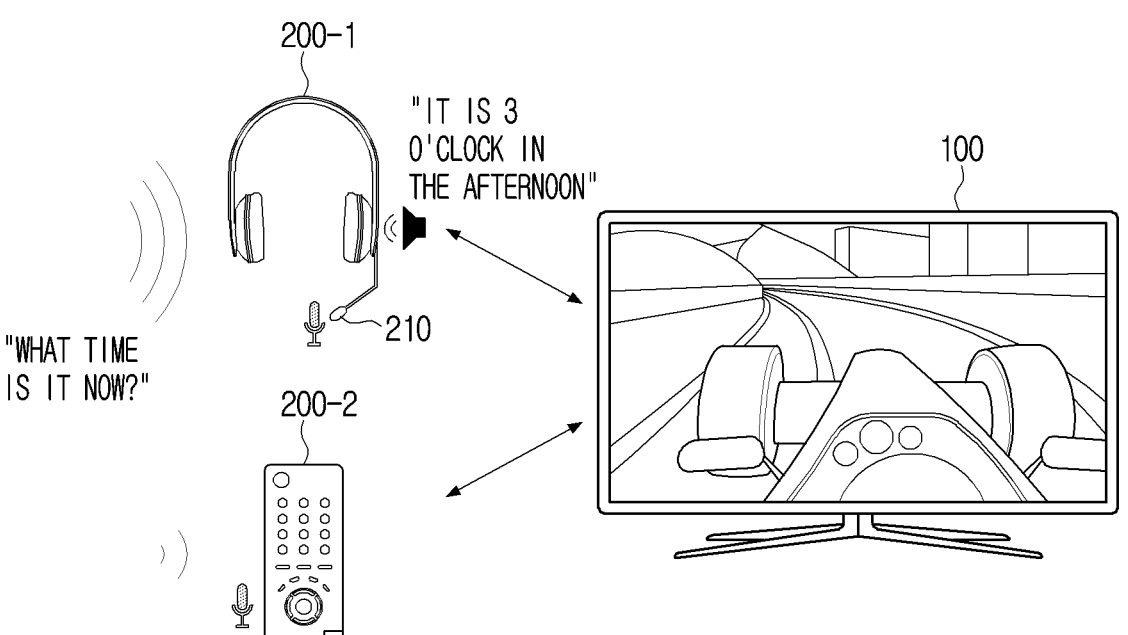
FIG. 8A is a view illustrating a method of identifying an external device based on a size of a voice signal according to one or more embodiments.
Figure 8B:
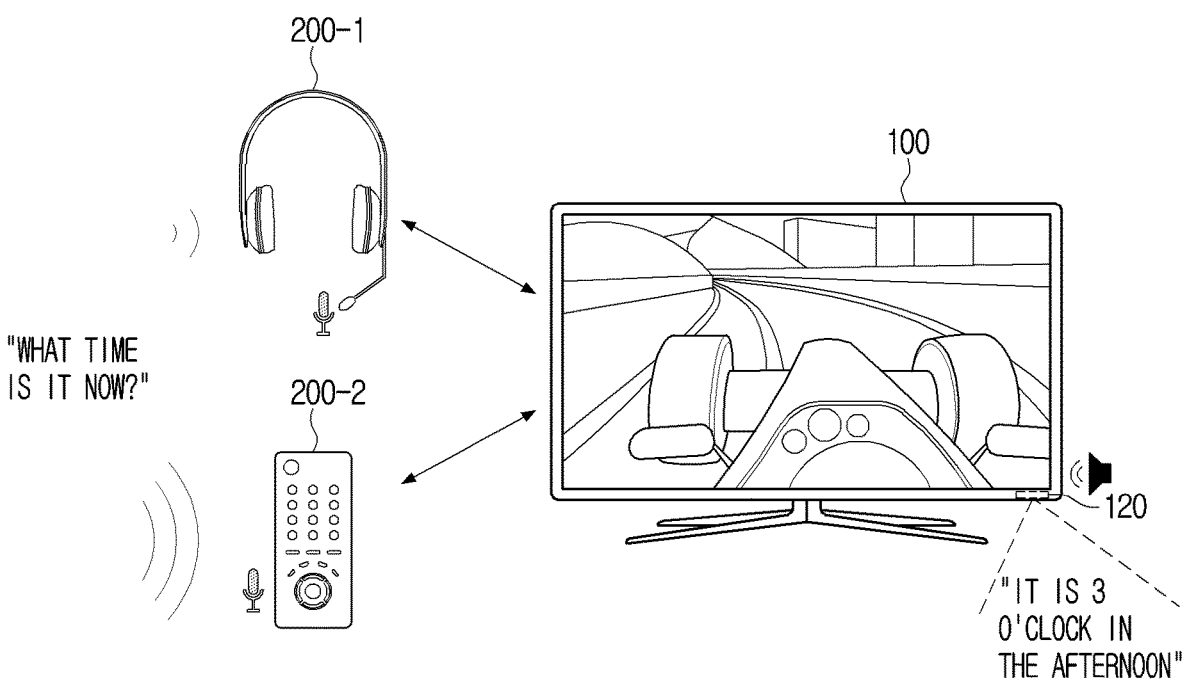
FIG. 8B is a view illustrating a method of identifying an external device based on a size of a voice signal according to one or more embodiments.

FIG. 8A and FIG. 8B are views provided to explain a method of identifying an external device based on a size of a voice signal according to one or more embodiments;

According to FIG. 8A, when the user's voice signal is received from the plurality of external devices 200-1, 200-2 through the communication interface 110, and if an external device, for example, the headset 200-1, where the size of the received voice signal is relatively large of the plurality of external devices 200-1, 200-2 is identified and the headset 200-1 is identified as a privacy device, the processor 140 may output a response signal regarding the user's voice signal to the headset 200-1 through the communication interface 110.

According to FIG. 8B, when the user's voice signal is received from the plurality of external devices 200-1, 200-2 through the communication interface 110, and if an external device, for example, the remote controller 200-2, where the size of the received voice signal is relatively large of the plurality of external devices 200-1, 200-2 is identified and the remote controller 200-2 is identified as not a privacy device, the processor 140 may output a response signal regarding the user's voice signal to the speaker 120.

Referring back to FIG. 2, when the user's voice signal is received from a plurality of external devices through the communication interface 110, the processor 140 may identify whether each of the plurality of external devices is a privacy device, and transmit a control signal for turning off a microphone of the device that is identified as not a privacy device of the plurality of external devices through the communication interface 110.

Figure 9:
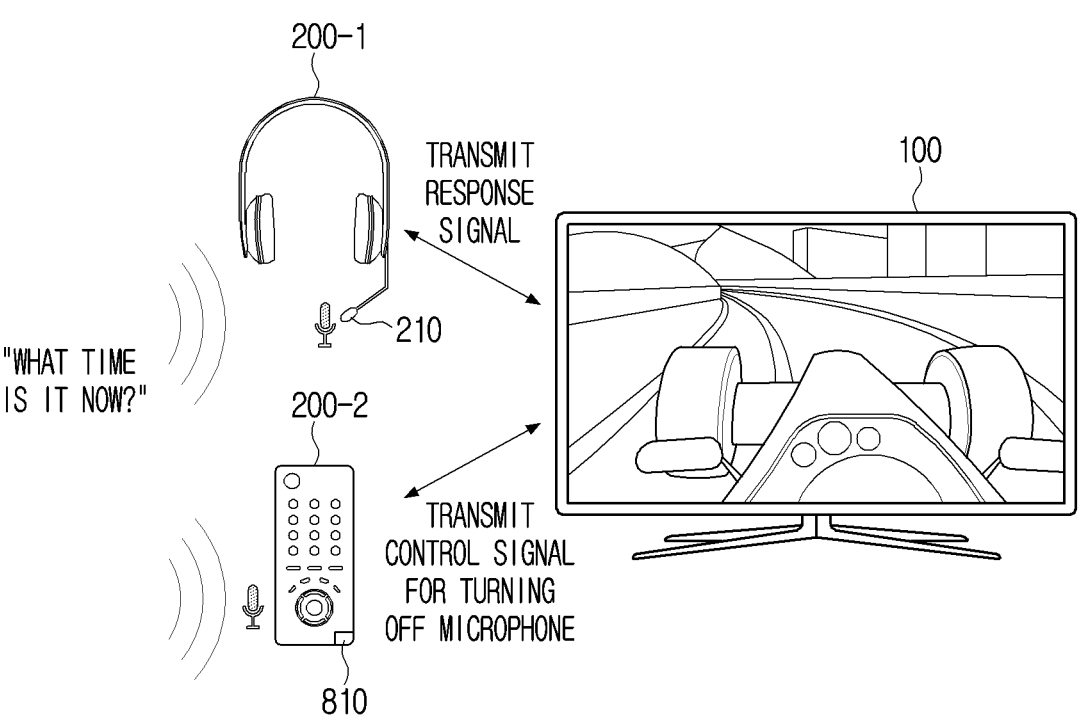
FIG. 9 is a view illustrating a method of controlling an external device according to a type of a plurality of external devices according to one or more embodiments.

FIG. 9 is a view provided to explain a method of controlling an external device according to a type of a plurality of external devices according to one or more embodiments.

According to FIG. 9, when the user's voice signal is received from the plurality of external devices 200-1, 200-2 through the communication interface 110, the processor 140 may identify the headset 200-1 of the plurality of external devices 200-1, 200-2 as a privacy device and identify the remote controller 200-2 as not a privacy device. The processor 140 may output a response signal regarding the user's voice signal to the headset 200-1 that is identified as a privacy device through the communication interface 110. In addition, the processor 140 may transmit a control signal for turning off a microphone 810 of the remote controller 200-2 that is identified as not a privacy device to the remote controller 200-2 through the communication interface 110.

Referring back to FIG. 2, while an audio signal corresponding to game content is output to at least one of an external device or the speaker 120, the processor 140 may identify if the external device is a privacy device when the user's voice signal is received from the external device. In other words, while an audio signal corresponding to a specific type of content is output, when the user's voice signal is received from the external device, the processor 140 may identify whether the external device is a privacy device. However, the present disclosure is not limited thereto, and when the user's voice signal is received from the external device while a specific display mode (e.g., a game mode) is provided, whether the external device is a privacy device may be identified.

Figure 10:
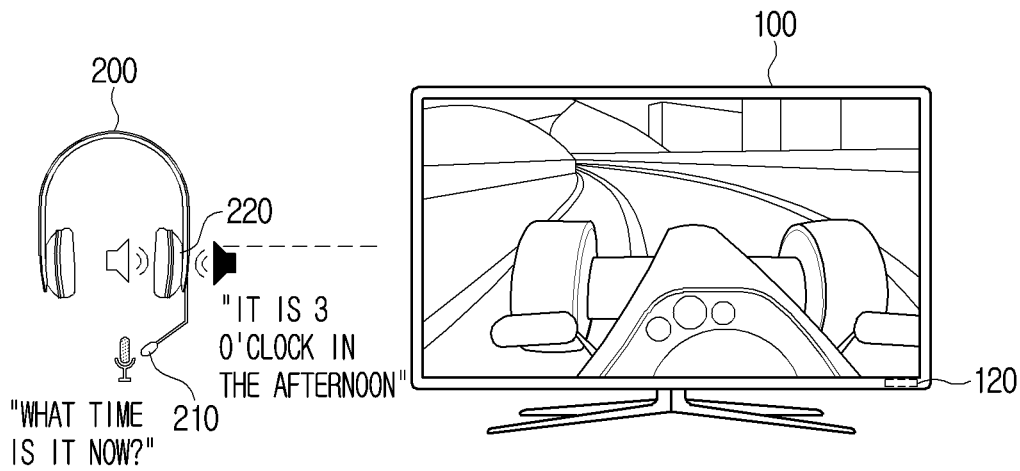
FIG. 10 is a view illustrating an output method of a response signal depending on a type of content that is being played according to one or more embodiments.
Figure 10:
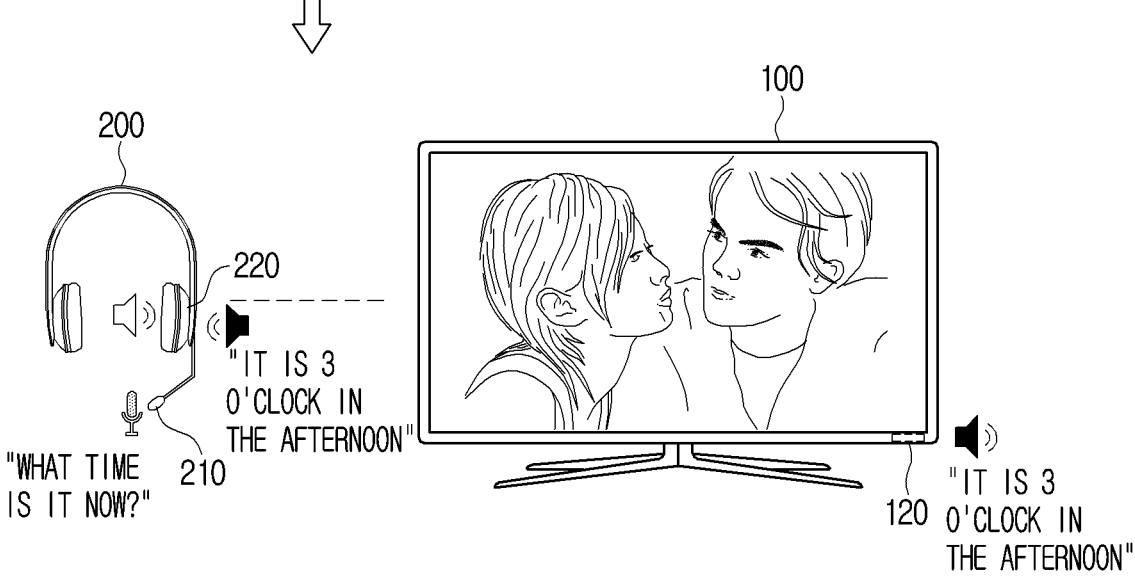

FIG. 10 is a view provided to explain an output method of a response signal depending on a type of content that is being played according to one or more embodiments.

According to FIG. 10, while an audio signal corresponding to game content is output to the headset 200-1 that is an external device, when the user's voice signal is received from the headset 200-1, the processor 140 may identify whether the headset 200-1 is a privacy device. When it is identified that the headset 200-1 is a privacy device, a response signal regarding the user's voice signal may be output to the headset 200-1 through the communication interface 110. In other words, when the user's voice signal is received from a privacy device while privacy content such as game content is provided, a response signal may be output only to the corresponding device.

In addition, according to FIG. 10, when the user's voice signal is received from the headset 200-1 while an audio signal corresponding to broadcasting content is output to the headset 200-1 that is an external device, the processor 140 may identify whether the headset 200-1 is a privacy device. When it is identified that the headset 200-1 is a privacy device, the processor 140 may output a response signal regarding the user's voice signal to the headset 200-1 through the communication interface 110 or to the TV speaker 120. In this case, the response signal may be output to the headset 200-1 and the TV speaker 120 simultaneously. In other words, even if the user's voice signal is received from a privacy device while public content such as broadcast content is provided, a response signal may be output not only through the corresponding device but also through the TV speaker 120.

As described above, the processor 140 may differently determine a device to output a response signal regarding the user's voice signal depending on the type of content that is currently provided.

Figure 11:
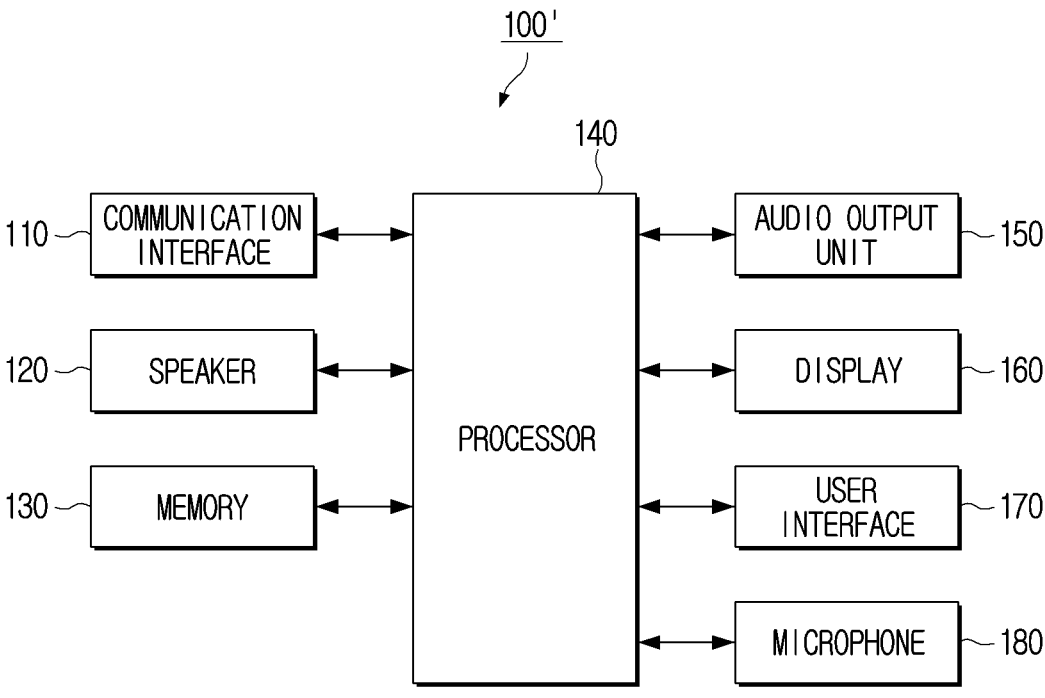
FIG. 11 is a view illustrating a block diagram of an electronic apparatus according to one or more embodiments.

FIG. 11 is a view illustrating a block diagram of an electronic apparatus according to one or more embodiments.

According to FIG. 11, an electronic apparatus 100' may include the communication interface 110, the speaker 120, the memory 130, the processor 140, an audio output unit 150, a display 160, a user interface 170, and a microphone 180. Among the components illustrated in FIG. 11, the detailed descriptions of the components that overlap with those illustrated in FIG. 2 will be omitted.

The audio output unit 150 may process and provide an audio signal.

According to one or more embodiments, the audio output unit 150 may process an audio signal and transmit the processed audio signal to the communication interface 110 or the speaker 120. Here, the audio output unit 150 may include a D/A converter and an audio amplifier, but is not limited thereto.

According to one or more embodiments, the audio output unit 150 may include a first audio output unit and a second audio output unit. Here, the first audio output unit may process and transmit an audio signal to the communication interface 110, and the second audio output unit may process and transmit an audio signal to the speaker 120. The first audio output unit and the second audio output unit may include a D/A converter and an audio amplifier, but is not limited thereto.

The display 160 may be implemented as a display including a self-emitting device or a display including a non-emitting device and a backlight. For example, the display 160 may be implemented as various types of displays such as Liquid Crystal Display (LCD), Organic Light Emitting Diodes (OLED) display, Light Emitting Diodes (LED), micro LED, Mini LED, Plasma Display Panel (PDP), Quantum dot (QD) display, or Quantum dot light-emitting diodes (QLED). The display 160 may include a driving circuit, a backlight unit, and the like, which may be implemented in a form such as an amorphous silicon thin film transistor (a-si TFT), a low temperature poly silicon (LTPS) TFT, or an organic TFT (OTFT). The display 160 may be implemented as a touch screen combined with a touch sensor, a flexible display, a rollable display, a three-dimensional (3D) display, or a display in which a plurality of display modules are physically connected, for example. In addition, the display 160 may include a touch screen so that a program can be executed using a finger or a pen (e.g., a stylus pen).

The user interface 170 may be implemented as a device such as a button, a touch pad, a mouse and a keyboard, or a touch screen or remote control transmission/reception that can also perform the above-described display function and manipulation input function. The remote control transmission/reception unit may receive a remote control signal from an external remote controller or transmit a remote control signal through at least one communication method among infrared communication, Bluetooth communication or WiFi communication.

The microphone 180 is configured to receive a user's voice or other sounds and convert them into audio data. For example, user commands related to one or more embodiments may be received through the microphone 180.

The electronic apparatus 100' may further include a tuner and a demodulator depending on the implementation. The tuner may receive a Radio Frequency (RF) broadcast signals from among RF broadcast signals received through an antenna by tuning a channel selected by the user or all previously stored channels. The demodulator may receive and demodulate a digital IF signal (DIF) converted from the tuner and perform channel decoding, for example. According to one or more embodiments, the input image received through the tuner may be processed through the tuner may be processed through the demodulator and then provided to the processor 140 for tone mapping processing.

Of course, one or more embodiments described based on FIGS. 1 to 12 above can be combined with each other.

Figure 12:
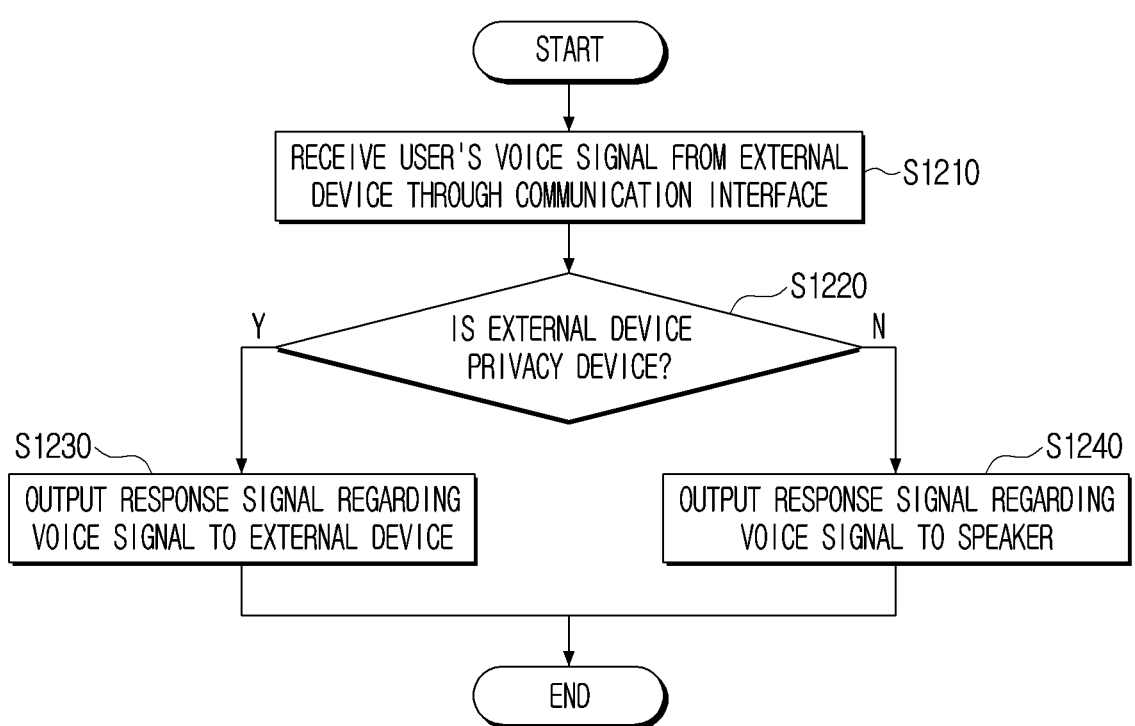
FIG. 12 is a flowchart illustrating a controlling method of an electronic apparatus according to one or more embodiments.

FIG. 12 is a flowchart provided to explain a controlling method of an electronic apparatus according to one or more embodiments.

According to a controlling method of an electronic apparatus in FIG. 12, when the user's voice signal is received from an external device through the communication interface (S1210), it is identified whether the external device is a privacy device (S1220). Subsequently, when it is identified that the external device is a privacy device (S1220:Y), the communication interface is controlled to output a response signal regarding the voice signal to the external device (S1230).

If it is identified that the external device is not a privacy device (S1220:N), a response signal regarding the voice signal is output to the speaker (S1240).

The step of S1220 may further include, when a trigger signal for recognition is received from an external device, activating a voice recognition function and identifying whether the external device is a privacy device, and when a signal corresponding to the user's subsequent voice is received from the external device identified as a privacy device, performing voice recognition regarding the received signal. In this case, the step of S1230 may further include outputting a response signal regarding the received signal to the external device through the communication interface based on a result of the voice recognition.

Here, the electronic apparatus may further include the first audio output unit connected to the communication interface and the second audio output unit connected to the speaker.

In the step of S1220, when the user's voice signal is received from an external device while an audio signal corresponding to audio content is output to at least one of the first audio output unit or the second audio output unit, whether the external device is a privacy device may be identified. Here, in the step of S1230, when it is identified that the external device is a privacy device, the first audio output unit may be controlled to output a response signal regarding the voice signal at a first output volume of the same level as an output volume of the audio signal.

In addition, in the step of S1240, when it is identified that the external device is not a privacy device, the second audio output unit may be controlled to output a response signal regarding the voice signal at a second output volume of a different level from an output volume of the audio signal.

Here, the second audio output unit may be controlled so that the second output volume is larger than the output volume of the audio signal.

In this case, the controlling method may further include, when the user's voice signal is received from a plurality of external devices through the communication interface, identifying whether each of the plurality of external devices is a privacy device, and when a first external device of the plurality of external devices is identified as a privacy device and a second external device is identified as not a privacy device, outputting a response signal regarding the voice signal to the speaker.

In addition, the controlling method may further include, when the user's voice signal is received from a plurality of external devices through the communication interface, identifying one of the plurality of external devices based on the size of the voice signal, when the identified external device is identified as a privacy device, outputting a response signal regarding the voice signal to the external device, and when the identified external device is identified as not a privacy device, outputting a response signal regarding the voice signal to the speaker.

Further, the controlling method may further include, when the user's voice signal is received from a plurality of external devices through the communication interface, identifying whether each of the plurality of external devices is a privacy device, and transmitting a control signal for turning off a microphone of the device identified as not a privacy device of the plurality of external devices.

In the step of S1220, when the user's voice signal is received from the external device while an audio signal corresponding to game content is output to at least one of the external device or the speaker, whether the external device is a privacy device may be identified.

In the step of S1220, whether the external device is a privacy device may be identified based on identification information of the external device.

In addition, in a non-transitory computer readable medium that stores computer instructions that, when executed by a processor of the electronic apparatus including a communication interface and a speaker, cause the electronic apparatus to perform operations, the operations may further include, when the user's voice signal is received from an external device through the communication interface, identifying whether the external device is a privacy device, when it is identified that the external device is a privacy device, outputting a response signal regarding the voice signal to the external device through the communication interface, and when it is identified that the external device is not a privacy device, outputting a response signal regarding the voice signal to the speaker.

In addition, the methods according to one or more embodiments described above may be provided in a computer program product. The computer program product may be traded as a product between a seller and a purchaser. The computer program product may include S/W programs, computer-readable storage medium storing S/W programs or products traded between sellers and buyers. For example, the computer program product may include products (e.g., a downloadable app) in the form of a S/W program that is distributed electronically through the electronic apparatus, the manufacturer of the electronic apparatus or an electronic market (e.g., Google Play Store, App Store). For online distribution, at least part of the S/W program may be stored in a storage medium or temporarily generated. In this case, the storage medium may be a storage medium of a manufacturer or an electronic market server, or a relay server.

According to one or more embodiments as described above, it is possible to identify a device to output a response signal regarding a voice signal depending on the type of external device connected to the electronic apparatus, so the user convenience is improved.

The methods according to one or more embodiments described above may be implemented in a form of application that may be installed in the existing electronic device. Alternatively, the above-described methods according to one or more embodiments may be performed using a deep learning-based artificial neural network (or deep artificial network), that is, a learning network model.

In addition, the methods according to one or more embodiments described above may be implemented only by software upgrade or hardware upgrade of the existing electronic device.

Further, one or more embodiments described above can be performed through an embedded server provided in the electronic device or a server of the display device.

According to one or more embodiments, various features described above may be implemented by software including instructions stored in a machine-readable storage medium (for example, a computer-readable storage medium). A machine may be an apparatus that invokes the stored instruction from the storage medium and may be operated depending on the invoked instruction, and may include the electronic device (for example, the electronic device A) according to one or more embodiments. In the case in which a command is executed by the processor, the processor may directly perform a function corresponding to the command using other components directly or under a control of the processor. The command may include codes created or executed by a compiler or an interpreter. The machine-readable storage medium may be provided in a form of a non-transitory storage medium. Here, the term "non-transitory" means that the storage medium is tangible without including a signal, and does not distinguish whether data are semi-permanently or temporarily stored in the storage medium.

In addition, the above-described methods according to one or more embodiments may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In case of the online distribution, at least a portion of the computer program product may be at least temporarily stored in a storage medium such as a memory of a server of a manufacturer, a server of an application store, or a relay server or be temporarily generated.

In addition, each of components (for example, modules or programs) according to one or more embodiments described above may include a single entity or a plurality of entities, and some of the corresponding sub-components described above may be omitted or other sub-components may be further included in the one or more embodiments. Alternatively or additionally, some components (for example, a module or a program) may be integrated into a single entity to perform the same or similar functions performed by each corresponding components prior to the integration. Operations performed by the modules, the programs, or the other components according to one or more embodiments may be executed in a sequential manner, a parallel manner, an iterative manner, or a heuristic manner, at least some of the operations may be performed in a different order or be omitted, or other operations may be added.

Although certain embodiments of the disclosure have been illustrated and described hereinabove, the disclosure is not limited to the above-mentioned embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic apparatus comprising:
   a communication interface configured to communicate with an external device;
   a speaker;
   memory storing at least one instruction; and
   at least one processor operatively connected to the communication interface, the speaker, and the memory,
   wherein the at least one instruction, when executed by the at least one processor individually or collectively, causes the electronic apparatus to:
   based on a voice signal being received from the external device through the communication interface, identify whether the external device is a privacy device;
   based on identifying that the external device is a privacy device, output a response signal regarding the voice signal to the external device through the communication interface; and
   based on identifying that the external device is not a privacy device, output a response signal regarding the voice signal through the speaker, and wherein the at least one instruction, when executed by the
at least one processor individually or collectively, fur-
ther causes the electronic apparatus to:
based on the voice signal being received from the
external device while an audio signal corresponding
to audio content is being output, identify whether the
external device is a privacy device; and
based on identifying that the external device is a
privacy device, output the response signal to the
external device through the communication interface
at a first output volume of a same level as an output
volume of the audio signal.

2. The electronic apparatus as claimed in claim 1, wherein
the at least one instruction, when executed by the at least one
processor individually or collectively, causes the electronic
apparatus to:
based on a trigger signal for voice recognition being
received from the external device, activate a voice
recognition function and identify whether the external
device is a privacy device;
based on a signal corresponding to a subsequent voice
being received from the external device identified as a
privacy device, perform voice recognition regarding
the signal corresponding to the subsequent voice; and
control the communication interface to output a response
signal regarding the signal corresponding to the sub-
sequent voice to the external device based on a result of
the voice recognition.

3. The electronic apparatus as claimed in claim 1, further
comprising:
a first audio output unit connected to the communication
interface; and
a second audio output unit connected to the speaker,
wherein the at least one instruction, when executed by the
at least one processor individually or collectively,
causes the electronic apparatus to:
based on the audio signal being output to at least one of
the first audio output unit or the second audio output
unit, identify whether the external device is a privacy
device;
based on identifying that the external device is a
privacy device, control the first audio output unit to
output the response signal regarding the voice signal
at the first output volume; and
based on identifying that the external device is not a
privacy device, control the second audio output unit
to output the response signal regarding the voice
signal at a second output volume of a level different
from the output volume of the audio signal.

4. The electronic apparatus as claimed in claim 3, wherein
the second output volume is greater than the output volume
of the audio signal.

5. The electronic apparatus as claimed in claim 1, wherein
the at least one instruction, when executed by the at least one
processor individually or collectively, causes the electronic
apparatus to:
based on the voice signal being received from a plurality
of external devices through the communication inter-
face, identify whether each of the plurality of external
devices is a privacy device; and
based on identifying that a first external device of the
plurality of external devices is a privacy device and a
second external device is not a privacy device, output
a response signal regarding the voice signal to the first
external device through the communication interface.

6. The electronic apparatus as claimed in claim 1, wherein
the at least one instruction, when executed by the at least one
processor individually or collectively, causes the electronic
apparatus to:
based on the voice signal being received from a plurality
of external devices through the communication inter-
face, identify at least one of the plurality of external
devices based on a size of the voice signal;
based on identifying that the at least one of the plurality
of external devices is a privacy device, control the
communication interface to output a response signal
regarding the voice signal to the at least one of the
plurality of external devices; and
based on identifying that the at least one of the plurality
of external devices is not a privacy device, output a
response signal regarding the voice signal through the
speaker.

7. The electronic apparatus as claimed in claim 1, wherein
the at least one instruction, when executed by the at least one
processor individually or collectively, causes the electronic
apparatus to:
based on the voice signal being received from a plurality
of external devices through the communication inter-
face, identify whether each of the plurality of external
devices is a privacy device; and
transmit a control signal for turning off a microphone of
a device that is identified as not a privacy device of the
plurality of external devices through the communica-
tion interface.

8. The electronic apparatus as claimed in claim 1, wherein
the at least one instruction, when executed by the at least one
processor individually or collectively, causes the electronic
apparatus to:
while an audio signal corresponding to game content is
output to at least one of the external device or the
speaker, identify whether the external device is a pri-
vacy device based on the voice signal being received
from the external device.

9. The electronic apparatus as claimed in claim 1, wherein
the at least one processor is further configured to execute the
at least one instruction to identify whether the external
device is a privacy device based on identification informa-
tion of the external device.

10. The electronic apparatus as claimed in claim 1,
wherein the external device comprises at least one of a
headset, a remote controller, a microphone, or a speaker.

11. A method of controlling an electronic apparatus that
comprises a communication interface and a speaker, the
method comprising:
based on a voice signal being received from an external
device through the communication interface, identify-
ing whether the external device is a privacy device;
based on identifying that the external device is a privacy
device, outputting a response signal regarding the voice
signal to the external device through the communica-
tion interface; and
based on identifying that the external device is not a
privacy device, outputting a response signal regarding
the voice signal through the speaker,
wherein the identifying the privacy device comprises:
based on the voice signal being received from the
external device while an audio signal corresponding
to audio content is being output, identifying whether
the external device is a privacy device,
wherein the outputting the response signal to the external
device through the communication interface comprises:

based on identifying that the external device is a privacy device, outputting the response signal to the external device through the communication interface at a first output volume of a same level as an output volume of the audio signal.

12. The method as claimed in claim 11, wherein the identifying whether the external device is a privacy device comprises:

based on a trigger signal for voice recognition being received from the external device, activating a voice recognition function and identifying whether the external device is a privacy device; and based on a signal corresponding to a subsequent voice being received from the external device identified as a privacy device, performing voice recognition regarding the signal corresponding to the subsequent voice, and wherein the outputting the response signal to the external device through the communication interface comprises:

outputting a response signal regarding the signal corresponding to the subsequent voice to the external device through the communication interface based on a result of the voice recognition.

13. The method as claimed in claim 11, wherein the electronic apparatus further comprises a first audio output unit connected to the communication interface and a second audio output unit connected to the speaker, wherein the identifying the privacy device comprises:

based on the audio signal being output to at least one of the first audio output unit or the second audio output unit, identifying whether the external device is a privacy device, wherein the outputting the response signal to the external device through the communication interface comprises:

based on identifying that the external device is a privacy device, controlling the first audio output unit to output the response signal regarding the voice signal at the first output volume, and wherein the outputting the response signal through the speaker comprises:

based on identifying that the external device is not a privacy device, controlling the second audio output unit to output the response signal regarding the voice signal at a second output volume of a level different from the output volume of the audio signal.

14. The method as claimed in claim 13, wherein the second output volume is greater than the output volume of the audio signal.

15. The method as claimed in claim 11, wherein the method further comprises:

based on the voice signal being received from a plurality of external devices through the communication interface, identifying whether each of the plurality of external devices is a privacy device; and based on identifying that a first external device of the plurality of external devices is a privacy device and a second external device is not a privacy device, outputting a response signal regarding the voice signal to the first external device through the communication interface.

16. The method as claimed in claim 11, wherein the method further comprises:

based on the voice signal being received from a plurality of external devices through the communication interface, identifying at least one of the plurality of external devices based on a size of the voice signal;

based on identifying that the at least one of the plurality of external devices is a privacy device, controlling the communication interface to output a response signal regarding the voice signal to the at least one of the plurality of external devices; and based on identifying that the at least one of the plurality of external devices is not a privacy device, outputting a response signal regarding the voice signal through the speaker.

17. The method as claimed in claim 11, wherein the method further comprises:

based on the voice signal being received from a plurality of external devices through the communication interface, identifying whether each of the plurality of external devices is a privacy device; and transmitting a control signal for turning off a microphone of a device that is identified as not a privacy device of the plurality of external devices through the communication interface.

18. The method as claimed in claim 11, wherein the method further comprises:

while an audio signal corresponding to game content is output to at least one of the external device or the speaker, identifying whether the external device is a privacy device based on the voice signal being received from the external device.

19. The method as claimed in claim 11, wherein the method further comprises identifying whether the external device is a privacy device based on identification information of the external device.

20. A non-transitory computer readable recording medium that stores computer instructions that, when executed by a processor of an electronic apparatus including a communication interface and a speaker, cause the electronic apparatus to perform at least one operation, the at least one operation comprising:

based on a voice signal being received from an external device through the communication interface, identifying whether the external device is a privacy device;

based on identifying that the external device is a privacy device, outputting a response signal regarding the voice signal to the external device through the communication interface; and based on identifying that the external device is not a privacy device, outputting a response signal regarding the voice signal through the speaker, wherein the identifying the privacy device comprises:

based on the voice signal being received from the external device while an audio signal corresponding to audio content is being output, identifying whether the external device is a privacy device, wherein the outputting the response signal to the external device through the communication interface comprises:

based on identifying that the external device is a privacy device, outputting the response signal to the external device through the communication interface at a first output volume of a same level as an output volume of the audio signal.

* * * * *